Jan. 25, 1966   F. S. BLACK ETAL   3,231,845
HIGH TEMPERATURE FLEXIBLE ELECTRICAL CABLE HAVING A PLURALITY
OF CONDUCTORS ARRANGED IN A SPIRAL CONFIGURATION
Filed Aug. 31, 1961

INVENTORS
FRANK S. BLACK
HAROLD B. FOOTE
BY

Irving M. Freedman

THEIR ATTORNEY

United States Patent Office 3,231,845
Patented Jan. 25, 1966

3,231,845
HIGH TEMPERATURE FLEXIBLE ELECTRICAL CABLE HAVING A PLURALITY OF CONDUCTORS ARRANGED IN A SPIRAL CONFIGURATION
Frank S. Black, Wenham, and Harold B. Foote, Lynn, Mass., assignors to General Electric Company, a corporation of New York
Filed Aug. 31, 1961, Ser. No. 135,321
2 Claims. (Cl. 339—29)

This invention relates to flexible conductor cables, and more particularly, to a flexible electrical cable suitable for use at extreme temperatures under conditions combining high vibration and mechanical and thermal shocks.

While the mounting of individual members or beads upon electrical conductors in order to provide an insulated, flexible cable is known, prior art arrangements have not proved entirely satisfactory in cables utilized, for example, in the connection of thermocouples mounted on engines and subjected to severe temperatures and vibration environments. While metal sheathed, mineral insulated, swaged type cables exhibit suitable temperature characteristics, they lack sufficient flexibility. On the other hand, while fiber cables exhibit sufficient flexibility, the binder required to hold the loose fibers or rovings together frequently burns off at elevated temperatures resulting in breakage of the insulation and failure of the cable. Also, fiber cables are susceptible to moisture absorption.

Insulating members mounted seriatim on the electrical conductors will withstand high temperatures and provide certain flexibility. However, problems are encountered by wearing and cutting of the conductor wires by the insulating member or beads, particularly under conditions of high vibrations such as 50 G from 5 to 1000 cycles per second to which certain cables are subjected when associated with jet engines. Single bore beads, in particular, have a tendency to spin on the conductor wire during vibration and wear through them. Beads with two or more holes with a strand of the conductor or support member through each hole encounter high alternating end stresses when the cables are flexed and vibrated. Such end stresses are developed when the cable is bent in a manner such as to cause one conductor wire to bend over the other when both are in the same plane. Since the top wire must go a further distance to end at the same point, uneven stresses are set up. In a fixed thermocouple system the wires cannot stretch and the end termination points of flexible cables are severely strained alternately whenever flexing or vibration occurs in the plane of the wires resulting in structural wire failures at such termination points.

It is an object of the present invention to provide an improved flexible cable suitable for use at high temperatures.

It is a further object of the present invention to provide an improved flexible cable of the bead type in which the beads are shaped so as to allow the conductors to rotate spirally thereby eliminating unequal end stresses.

It is another object of the present invention to provide an improved flexible cable which is uncomplex in structure and is sufficiently rugged to withstand high thermal and mechanical shocks and vibration and yet not be effected by moisture.

It is still another object of the present invention to provide an improved high temperature, relatively lightweight flexible cable of the bead type which is uncomplex in structure and fabrication and which provides long life, minimizes stresses, and is resilient to abrasion.

Further objects and advantages of the invention will become apparent as the following description proceeds, and the features of novelty which characterize the invention will be pointed out with particularity in the claims annexed to and forming a part of this specification.

In accordance with one form of the invention, a beaded type of insulated flexible multiconductor cable is provided in which the insulating elements are mounted seriatim on flexible electrically conducting wires. The insulating elements comprise a central portion having substantially planar end portions perpendicular to the axis of the central portion and a plurality of apertures extending parallel to the axis through the central portion through which the wires pass. A centrally located convex portion extends from at least one end portion along the axis with the convex portion being positioned within the region defined by the wires passing through the apertures.

More particularly, the apertures are enlarged holes, larger than the diameter of the conducting wires. The enlarged holes may be elongated in a direction along a circular path having a center upon the axis to allow the conducting wires limited freedom of motion within the holes to permit spiral rotation or twisting of the cable in addition to the flexing thereof.

For a better understanding of this invention, reference may be had to the following description taken in connection with the accompanying drawings in which.

Referring to the figures, it will be seen that one form of an insulated cable constructed in accordance with the invention comprises a plurality of insulating elements mounted seriatim on four flexible electrically conductive wires 2, 3, 4, 5. The wires 2, 3, 4 and 5 are terminated in suitable electrical connectors such as AN type of connectors 8 and 9.

Figure 3:
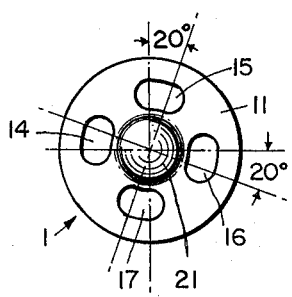
FIG. 3 is an end view of the insulating element shown in FIG. 2.

The insulating elements 1 comprise a central portion 11 which is in the form of a right circular cylinder concentric about the axis 12. Four radially spaced apertures 14, 15, 16, and 17 extend through the central portion 11 in a direction parallel to the axis 12. The apertures are substantially equally spaced from each other in a circumferential direction and equidistant from the axis 12. The apertures 14, 15, 16, and 17 are elongated in a direction along a circular path having a center upon the axis 12 to permit the twisting of the cable in a manner discussed below. By way of example, for cables utilizing conductive wires which have an outside diameter of approximately .052 inch (16 gage) and are fabricated of chromel or alumel, the apertures are positioned about a .202 inch diameter circle and have extensions of 20 degrees as indicated in FIG. 3. The apertures have terminal radii of .03 inch in an insulating element in which the central portion has a diameter of .343 inch and an axial length of .312 inch.

Extending outwardly along the axis 12 of the central portion 11 are a pair of spherical convex portions 20 and 21 having a radius of $\frac{1}{16}$ of an inch and $\frac{1}{32}$ inch fillets such as 22 where the convex portions meet the end portions 23 and 24 of the central portion 11 of the insulating element 1.

It is to be noted that the convex portions 20 and 21 of the insulating element 1 are positioned within the region defined by the flexible electrical conductors 2, 3, 4, and 5. This facilitates manufacturing, increases the strength of the elements since the apertures are not through curved surfaces, enhances the flexibility of the cable, and minimizes sharp bends in the conductors passing from one member to the next. The insulating elements 1 are constructed of a material known commercially as Alsimag No. 614 sold by the American Lava Company and comprising a high purity, dense alumina. Such a material exhibits high temperature strength and is resistant to the effects of moisture. The insulating elements 1 may conveniently be formed from an extruded slug of semicured material in a die casting process.

The shape of the insulating elements facilitates ease of manufacture, provides a high strength, low weight element, and minimizes and/or eliminates failures and fatique problems which occur with prior art insulating elements and cables. While the insulating elements 1 may be rotated to a limited degree about the conductive wires 2, 3, 4, and 5, the insulating elements cannot spin on the wire during vibration and wear through them.

Multiconductor cables, in addition to providing increased electrical capacity, prevent the spinning of the insulating elements on the wires. However, particularly when the ends of the cable are fixed, such cables provide high alternating end stresses when the cable is flexed and vibrated, which may cause fatigue and failure of the cable as described above. In cables wherein the ends are fixed, the wires cannot stretch and there is a problem encountered because certain of the conductors may be placed in tension while others are in compression or slack. Then the situation reverses as the cable vibrates in one direction and then the other. Therefore, the end termination points of such flexible systems may be severely strained alternately whenever flexing or vibration occurs, in a plane of the wires, causing failures of junctions and of welded connections. The difficulty encountered with such multiwired systems is avoided through use of the radial elongated wire apertures described above. Cables constructed in accordance with the present invention, in addition to being flexible in order to connect between the required points, may have a twist imparted to them in the order of one revolution every three inches of cable. Thus, a given conductor, because of the twisting, is throughout its length alternately above and below other conductors. Thus, portions of the same conductor are in tension while other portions of the same conductor or wire are in compression minimizing and/or eliminating the problem of end stresses which cause cable failure. The radially elongated apertures enable the twisting of the cable without problems of sharp edges and sharp bending of the conductors as they pass out of one insulating member and into another insulating member even though the apertures are not aligned in a straight line but are radially displaced from one another. Accordingly, under conditions of vibration and shock the cable may flex without providing end stresses and there are no edges or sudden bending of the conductors passing from one insulating member to the next. The cable described above may readily be bent into a mean radius of one-half inch since, with the dimensions given, planar end portions of adjacent insulating elements are normally separated from one another by 0.131 inch.

Thus, an improved multiwire insulated cable has been disclosed which is resistant to abrasion from vibration, will withstand thermal and mechanical shocks, is more flexible than many types of mineral insulated cables, exhibits long life (many thousands of hours at elevated temperatures), resists moisture effects, minimizes bead stress, and is lighter than many prior art arrangements.

While a bead or insulating element provided with a pair of convex projections 20 and 21 is preferred, particularly for cables having three or more conductors, a single projection such as 20 could be used in combination with a planar or slightly convexed end portion 23. With such an arrangement the beads would be mounted with the convex projection of one bead in contact with the planar or slightly convexed end portion of the next. Also, such cables would be less flexible than those described above.

Figure 1:
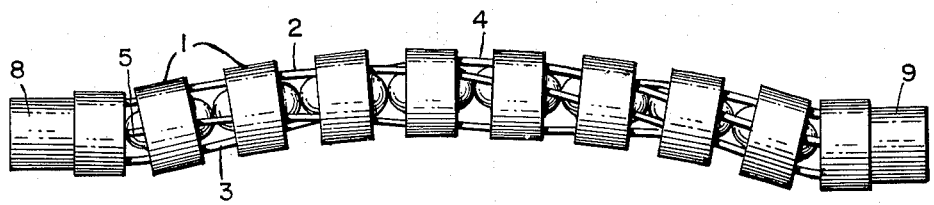
FIG. 1 is a partial plan view showing a flexible cable incorporating the invention.
Figure 2:
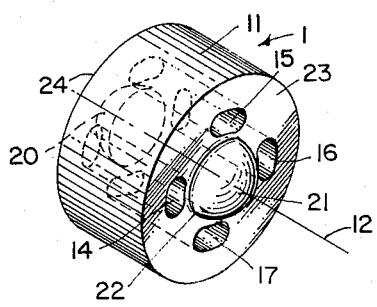
FIG. 2 is an isometric view of one of the insulating elements of the cable of FIG. 1.
Figure 4:
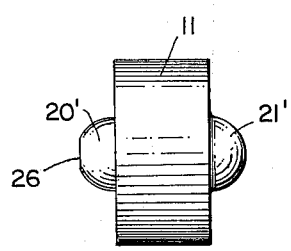
FIG. 4 is a side view of an alternate embodiment of an insulating element particularly suited for use on two wire cables.

FIG. 4 shows an arrangement which may be advantageous for use with cables having two conductor wires. Referring to FIG. 4, it will be seen that the insulating element 1 comprises a central portion 11 and a convex projection 21' of substantially hemispherical configuration as does the element 1 of FIG. 2. However, the convex projection 20' has a flatted end portion 26. This prevents the mating insulating elements in a two-conductor cable from misaligning and "cocking" relative to one another in such a way as to damage the wires; that is, with one of the convex portions 20 and 21 passing above the other instead of merely touching each other in end-to-end axial alignment. With such an arrangement the beads 11 would be arranged such that the convex projection 21' of one bead is in contact with the projection 20' of the next bead.

While the apertures 14, 15, 16, and 17 have been shown as being elongated in a direction along a circular path having a center upon the axis 12, it should be appreciated that they could be enlarged apertures having a round or some other configuration as long as they permit the twisting of the cable and the conductive wires 2, 3, 4, and 5. Such elongation may be desirable in beads of small cross section. Also, the apertures could be transverse to the axis 12 in a direction to provide for the twisting of the conductive wires. In addition, the cable could be utilized in a conductive sheath with a powdered insulant or dust such as MgO filler to dampen vibration of the beads. However, such an arrangement may tend to reduce the flexibility of the cable.

Therefore, while particular embodiments of the subject invention has been shown and described herein, they are in the nature of description rather than limitation, and it will occur to those skilled in the art that various changes, modifications, and combinations may be made within the province of the appended claims without departing either in spirit or scope from this invention in its broader aspects.

What we claim as new and desire to secure by Letters Patent of the United States is:

1. In a multiwire insulated cable including at least two electrically conducting, flexible wires for establishing connection between first and second locations under conditions of high vibration and mechanical and electrical shocks, first and second connectors affixed to the wires at opposed ends thereof to connect the wires to mating connectors at the first and second locations, the cable having bends therein between the first and second connectors, the improvement comprising a plurality of insulator elements, each said insulator element including:

(a) a central portion with substantially planar end portions perpendicular to an axis of said central portion, (b) at least one centrally located convex portion integral with said central portion and extended along the axis, and (c) a plurality of apertures through said central portion parallel to said axis, said apertures being elongated in a direction along a circular path having a center upon said axis, one of the wires passing through each of said apertures in a direction askew to said axis when the wires are spirally rotated about said axis and a plurality of insulating elements mounted seriatim on the wires whereby the wires can complete at least one spiral revolution between the first and second locations.

2. In a multiwire insulating cable including two electrically conducting flexible wires for establishing connection between first and second locations under conditions of high vibration and mechanical and electrical shock, first and second connectors affixed to the wires at opposed ends to connect the wires to mating connectors held in fixed positions at two fixed points, the mating connectors being subjected to high levels of vibration to cause them to be set in vibratory motion, said cable, in passing between the fixed points, having bends therein, the improvement comprising a plurality of insulator elements, each said insulator element including:

(a) a central portion with substantially planar end portions perpendicular to an axis of said central portion, (b) a centrally located convex portion extending from one of said end portions along said axis, the termination of said end portion of each said insulating element contacting an adjacent insulating element to fix the position of each said insulating element along the cable, said central portion having a longitudinal dimension of the order of magnitude as the length of wire extending between said planar end portions, and (c) a plurality of apertures extending parallel to said axis and through said central portion, each of the wires passing through one of said apertures, said apertures being elongated in a direction along a circular path having a center upon said axis to permit the wires to be askew to said axis to allow continuous, spiral rotation of the wires about said axis to minimize stress in the wires, each wire completing one spiral between the fixed points.

References Cited by the Examiner

UNITED STATES PATENTS

| | | | |
|---|---|---|---|
| 320,229 | 6/1885 | Delany | 174—111 X |
| 1,640,744 | 8/1927 | Zapf | 174—111 X |
| 1,984,486 | 12/1934 | Lange | 174—111 X |
| 2,139,333 | 12/1938 | Pittman et al. | 174—165 |
| 2,934,586 | 4/1960 | Gesell | 174—88 X |
| 3,013,108 | 12/1961 | Sweeney | 174—111 |

FOREIGN PATENTS 191,491   8/1937   Switzerland.

BERNARD A. GILHEANY, *Primary Examiner.*

JOHN P. WILDMAN, *Examiner.*

JOHN F. BURNS, ROBERT K. SCHAEFER, W. F. ZAGURSKI, D. A. KETTLESTRINGS, *Assistant Examiners.*